(12) United States Patent
Pekola et al.

(10) Patent No.: US 6,784,012 B2
(45) Date of Patent: Aug. 31, 2004

(54) METHOD FOR MEASURING TEMPERATURE IN A WIDE RANGE USING A TUNNEL JUNCTION

(75) Inventors: Jukka Pekola, Jyväskylä (FI); Kurt Gloos, Jyväskylä (FI)

(73) Assignee: Nanoway Oy, Jyvaskyla (FI)

( * ) Notice: Subject to any disclaimer, the term of this patent is extended or adjusted under 35 U.S.C. 154(b) by 0 days.

(21) Appl. No.: 10/258,629

(22) PCT Filed: Apr. 25, 2001

(86) PCT No.: PCT/FI01/00395

§ 371 (c)(1),
(2), (4) Date: Oct. 24, 2002

(87) PCT Pub. No.: WO01/81881

PCT Pub. Date: Nov. 1, 2001

(65) Prior Publication Data

US 2003/0094655 A1 May 22, 2003

(30) Foreign Application Priority Data

Apr. 27, 2000 (FI) .............................................. 20000982

(51) Int. Cl.$^7$ .............................. H01L 21/66; G01K 7/00
(52) U.S. Cl. ........................................ 438/54; 374/178
(58) Field of Search ...................... 438/54, 55; 374/100, 374/163–185; 257/414, 467–470

(56) References Cited

U.S. PATENT DOCUMENTS

| | | | |
|---|---|---|---|
| 5,321,276 A | 6/1994 | Kurakado et al. | |
| 5,634,718 A | 6/1997 | Martinis et al. | |
| 5,753,935 A | 5/1998 | Kurakado et al. | |
| 5,947,601 A | * 9/1999 | Pekola ....................... | 374/163 |
| 6,104,045 A | 8/2000 | Forbes et al. | |
| 6,225,165 B1 | 5/2001 | Noble, Jr. et al. | |
| 6,229,161 B1 | 5/2001 | Nemati et al. | |

FOREIGN PATENT DOCUMENTS

EP 0813046 12/1997

OTHER PUBLICATIONS

K. DeMeyer, S. Kubicek and H. van Meer, *Raised Source/Drains with Disposable Spacers for sub 100 nm CMOS technologies*, Extended Abstracts of International Workshop on Junction Technology 2001.

Mark Rodder and D. Yeakley, *Raised Source/Drain MOSFET with Dual Sidewall Spacers*, IEEE Electron Device Letters, vol. 12, No. 3, Mar. 1991.

Yang–Kyu Choi, Daewon Ha, Tsu–Jae King and Chenming Hu, *Namoscale Ultrathin Body PMOSFETs With Raised Selective Germanium Source/Drain*, IEEE Electron Device Letters, vol. 22, No. 9, Sep. 2001.

Oct. 10, 2001, N. Lindert, Y.–K. Choi, L. Chang, E. Anderson, W.–C. Lee, T.–J. King, J. Bokor, and C. Hu, *Quasi–Planar FinFETs with Selectively Grown Germanium Raised Source/Drain*, 2001 IEEE International SOI Conference, 10/01.

(List continued on next page.)

Primary Examiner—Long Pham
Assistant Examiner—Marcos D. Pizarro-Crespo
(74) Attorney, Agent, or Firm—Fildes & Outland, P.C

(57) ABSTRACT

A method for measuring temperature T over a wide range by exploiting a tunnel junction, in which the tunnel junction includes two metallic conductors and a thin insulating layer between the conductors. The resistance R of the insulating layer is measured over the linear section of the voltage-current curve and the temperature T is determined from the equation:

$$\frac{1}{R} = \frac{1}{R_0}\left(1 + \left(\frac{T}{T_0}\right)^2\right),$$

in which $R_0$ is a previously calibrated constant and $T_0$ is a material constant.

7 Claims, 3 Drawing Sheets

OTHER PUBLICATIONS

1998, T. Ohguro, H. Naruse, H. Sugaya, S. Nakamura, E. Morifuji, H. Kimijima, T. Yoshitomi, T. Morimoto, H.S. Momose, Y. Katsumata, and H. Iwai, *High Performance RF Characteristics of Raised Gate/Source/Drain CMOS with Co Salicide*, 1998 Symposium on VLSI Technology Digest of Technical Papers.

Hsiang–Jen Huang, Kun–Ming Chen, Tiao–Yuan HUang, Tien–Sheng Chao, Guo–Wei Huang, Chao–Hsin Chien, and Chun–Yen Chang, *Improved Low Temperature Characteristics of P–Channel MOSFETs with $Si_{1-x}Ge_x$ Raised Source and Drain*, IEEE Transactions on Electron Devices, vol. 48, No. 8, Aug. 2001.

* cited by examiner

METHOD FOR MEASURING TEMPERATURE IN A WIDE RANGE USING A TUNNEL JUNCTION

TECHNICAL FIELD

The present invention relates to a method for measuring temperature in a wide range, using a tunnel junction, in which the tunnel junction comprises two metallic conductors with a thin insulation between them, which has a measurable resistance.

BACKGROUND OF THE INVENTION

A thermometer based on a Coulomb blockade is known from Finnish patent number 102695 (corresponding U.S. Pat. No. 5,947,601). The phenomenon known as a Coulomb blockade causes a conductance drop at the zero point of the bias voltage, the characteristic magnitudes of which depend on the temperature. However, such a conductance drop can only be detected at low temperatures, the method being difficult to apply at temperatures above 20 K. The aforementioned patent discloses achieving a measurement range of 1–100 K with the aid of the smallest size of tunnel junction, but in practice this is extremely difficult to achieve. Thus a related technique has been sought, by means of which it is possible to reach as high as to the room-temperature range.

SUMMARY OF THE INVENTION

The present invention provides a method for measuring temperature T in a wide range using a tunnel junction which includes two metallic conductors and a thin insulator between the conductors, which has a measurable resistance R. The method is characterized in that the resistance R can be measured over the linear section of the voltage-current curve and the temperature T determined from the formula:

$$\frac{1}{R} = \frac{1}{R_0}\left(1 + \left(\frac{T}{T_0}\right)^2\right),$$

in which $R_0$ is a previously calibrated constant and $T_0$ is a material constant. According to the invention, the insulating material is an oxide of one conducting material and at least one conductor is fabricated from a material, which belongs to the group aluminium (Al), chromium (Cr), niobium (Nb), copper (Cu).

The measurement is carried out by using one chain of several tunnel junctions or several such chains connected in parallel.

The method is further characterized in that the measured resistance R is fit in the range 10 kΩ–1000 kΩ. The measurement is carried out using low-frequency alternating current, the amplitude of which is in the range 0.1–10 mV for each of the tunnel junctions in the chain.

The measurement may be calibrated by cooling the tunnel junction being measured to a very low temperature, in which case the constant $R_0$ being calibrated is obtained straight from the measured resistance R with a high accuracy.

The invention is largely based on the realization that the relative change in the conductance of a tunnel junction is proportional to the square of the absolute temperature and that the proportionality coefficient is independent of the thickness of the insulation of the tunnel junction. Although, according to the previously known theory, a square-law dependence was expected, a dependence on the thickness of the insulation was also predicted, which, according to observations, is not the case. The method, according to the invention, for measuring temperature requires only a single calibration point, which is possible to obtain by simply cooling the sensor to a very low temperature. The other benefits and applications of the invention are disclosed below, in connection with the embodiments.

In the following, the invention is examined with reference to s the accompanying drawings which show the principles and embodiments of the method according to the invention.

DETAILED DESCRIPTION OF THE INVENTION

Figure 1:
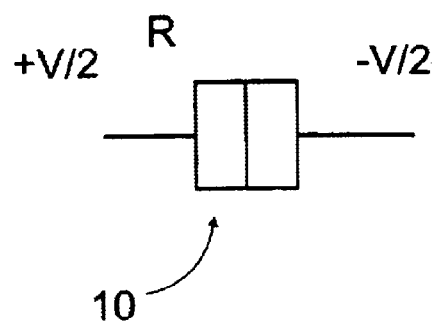
FIG. 1 shows the symbol of the tunnel junction.

By means of a sensor according to FIG. 1, which includes only a single tunnel junction 10, it is possible to measure temperature over a wide range, the lower limit being in the order of ten degrees Kelvin. It has become apparent that the temperature response of a tunnel junction is in no way dependent on its thickness, but only on the material, according to the following equation:

$$\frac{1}{R} = \frac{1}{R_0}\left(1 + \left(\frac{T}{T_0}\right)^2\right),$$

in which $R_0$ is a previously calibrated constant and $_0T$ is a material constant. $T_0$ is thus constant for all sensors, in which the same materials are used. For example, for an Al—O—Al junction, $T_0$=725 K±10 K.

Figure 2:
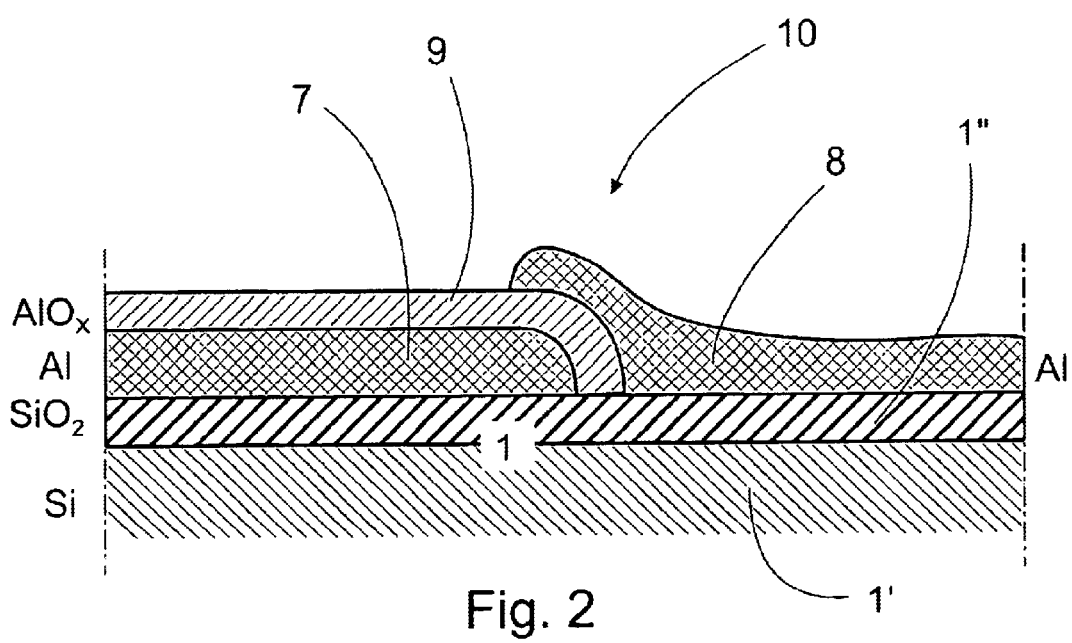
FIG. 2 shows the construction of the tunnel junction.

The tunnel junction 10 and the conductors 7 and 8 required by it are formed on a pure silicon substrate 1, FIG. 2. An insulating layer 1" (a layer of oxide or nitride) is formed on the surface of the base material 1', so that the sensor can also be used at room temperature. A conductor layer 8, an insulating layer 9, and a second conductor layer 7 are formed in stages by means of electron-beam lithography. The tunnel junction 10 is formed at the point of contact of the conductors 7 and 8, where there is an insulating layer about 1-nm thick between them. In the figure, the thickness of the insulating 5 layer 9 is exaggerated. The thickness of the conductors 7 and 8 is actually about 100 nm. The aluminium oxide insulating layer creates a 2-eV-high potential wall, which, according to classical physics, the electrons of the conducting material cannot surmount. Due to the quantum mechanical tunnelling phenomenon, however, it is possible to detect a current that is proportional to the square of the temperature, and which is a function of the voltage. The measurement voltage is typically in the order of 1 mV at the junction of the chain, the measurable resistance being in the range 10 kΩ—1000 kΩ.

Figure 3:
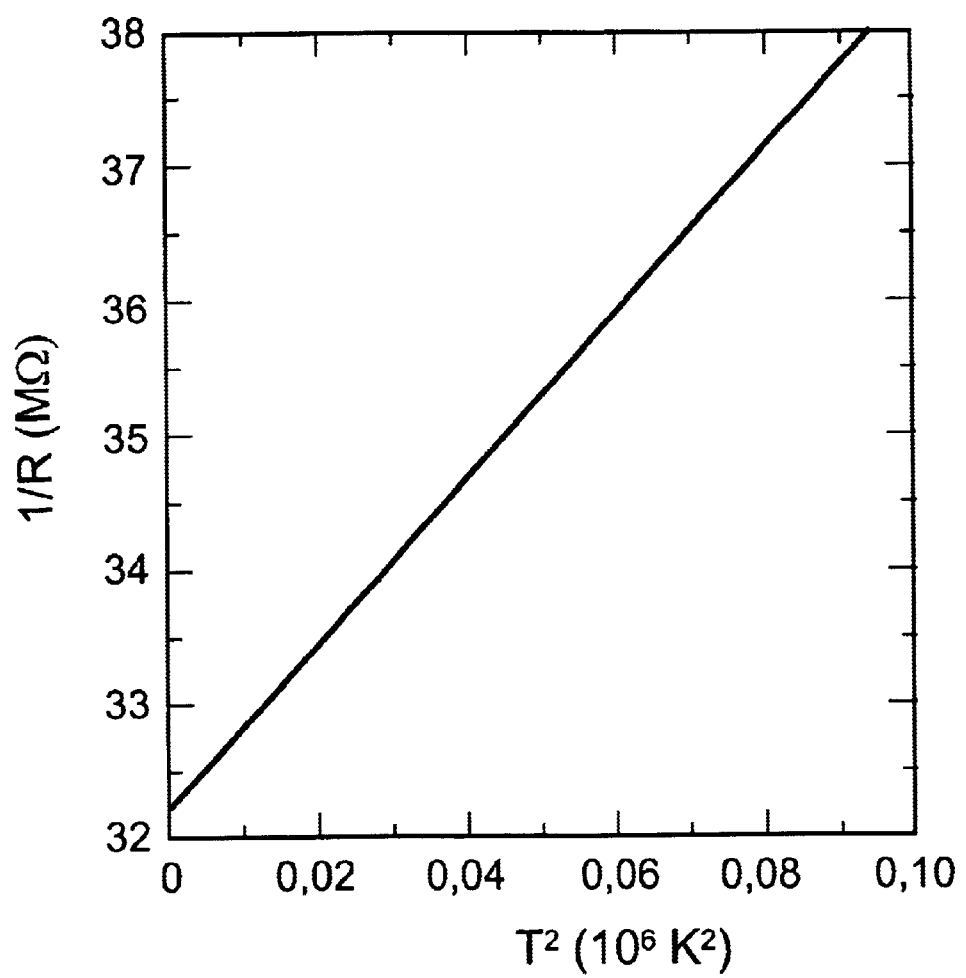
FIG. 3 shows the measured dependence of the conductance of the tunnel junction on the square of the temperature.

FIG. 3 shows the dependence between the conductance and the temperature of one Al—O—Al construction temperature sensor. The conductance is quite closely linear in relation to the square of the temperature. In this case, the straight line follows the equation:

$$\frac{1}{R(T)} = 32.222 \frac{1}{M\Omega} + 61,3 \frac{1}{M\Omega} T^2 \frac{1}{kK^2}$$

$$= 32.222 \left(1 + \left(\frac{T}{0,725[kK]}\right)^2\right) \frac{1}{[M\Omega]}$$

The latter corresponds to the general form:

$$\frac{1}{R} = \frac{1}{R_0}\left(1 + \left(\frac{T}{T_0}\right)^2\right),$$

in which $R_0$ is a previously calibrated constant depending on the dimensions of the tunnel junction and $T_0$ is a material constant.

The constant to be calibrated can be measured, for example, with the aid of the triple point of water or simply by cooling the sensor to a temperature that is substantially lower that the lowest measurement temperature, in which case the temperature term becomes insignificant and the measurement gives the value of $R_0$ directly. If a primary CB sensor is available and the measurement ranges mutually overlap, the calibration point can be obtained through this procedure.

It has become apparent that the constant $T_0$ depends on the conductor material, for which it is possible to use aluminium, chromium, niobium, or copper, or combinations of these. In this case, chromium and niobium are particularly preferable, as the circuit can be manufactured using present technology and they provide a stronger temperature response than aluminium. The oxide layer is generally an oxide of a first evaporated conductor material.

Figure 4:
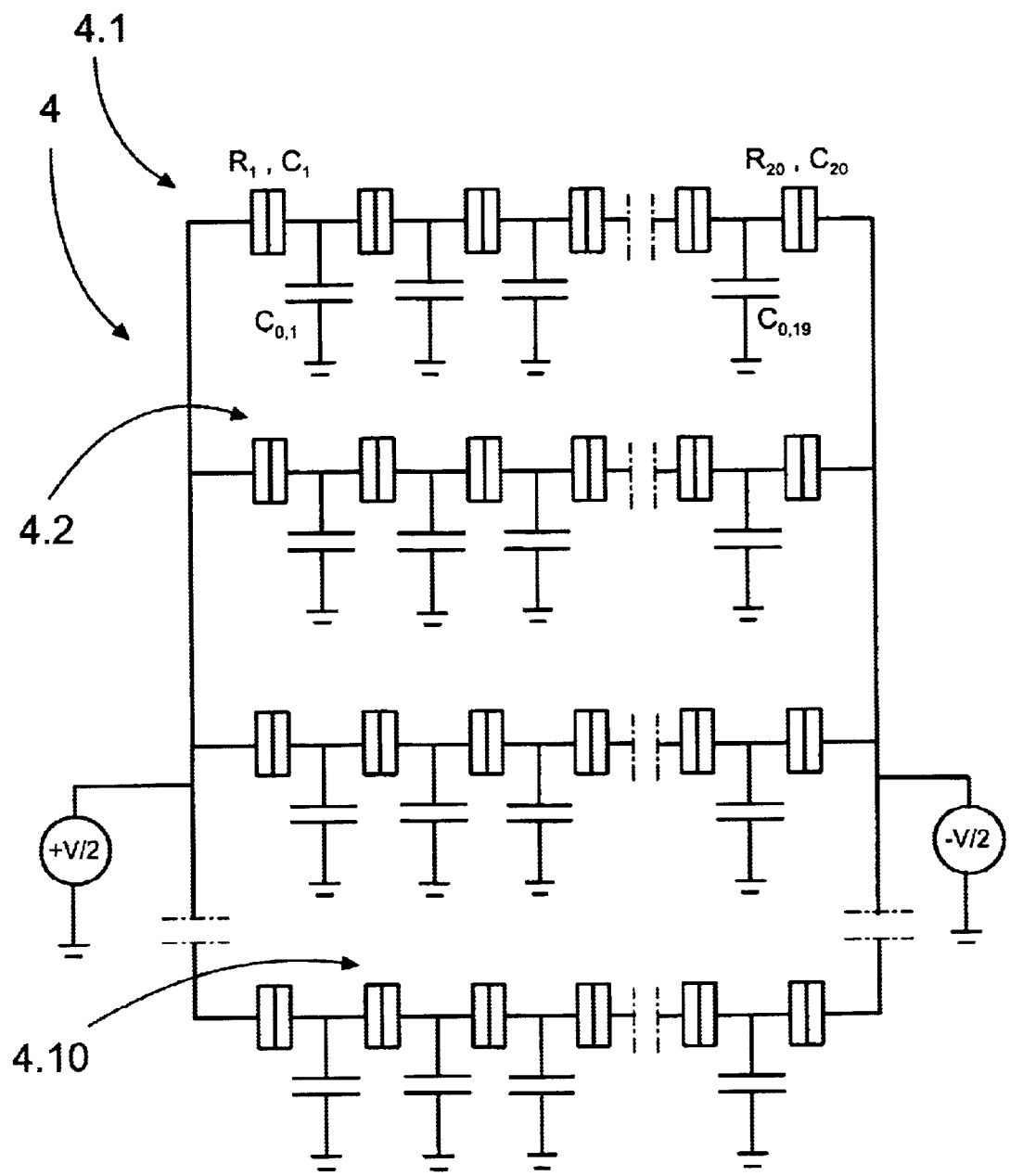
FIG. 4 shows an improved sensor.

For measurement technical reasons, the resistance being measured is fit, as explained above, preferably in the range 10 kΩ–1000 kΩ and low-frequency (f=10–100 Hz), low-voltage (V=0.1–10 mV for each tunnel junction in the chain) AC current is used. In that case, it is preferable to use a sensor according to FIG. 4, which can be the same as the sensor used in a CB thermometer. The measurement procedure is altered to correspond to the new method. The measurement circuit 4 includes 10 identical tunnel junction chains 4.1 . . . 4.10, with 20 tunnel junctions in each, connected in parallel. If the resistance of a single chain is 400 kΩ, the resistance of the entire circuit is only 40 kΩ. At its maximum, the total resistance may not exceed 150 kΩ in a CB thermometer. Preferably there are 4 or 5 chains in parallel, so that fabrication does not become unreasonably difficult, but the resistance of the circuit will fall to less than 100 kΩ. Such a sensor is also well suited to the new use presented here.

Figure 5:
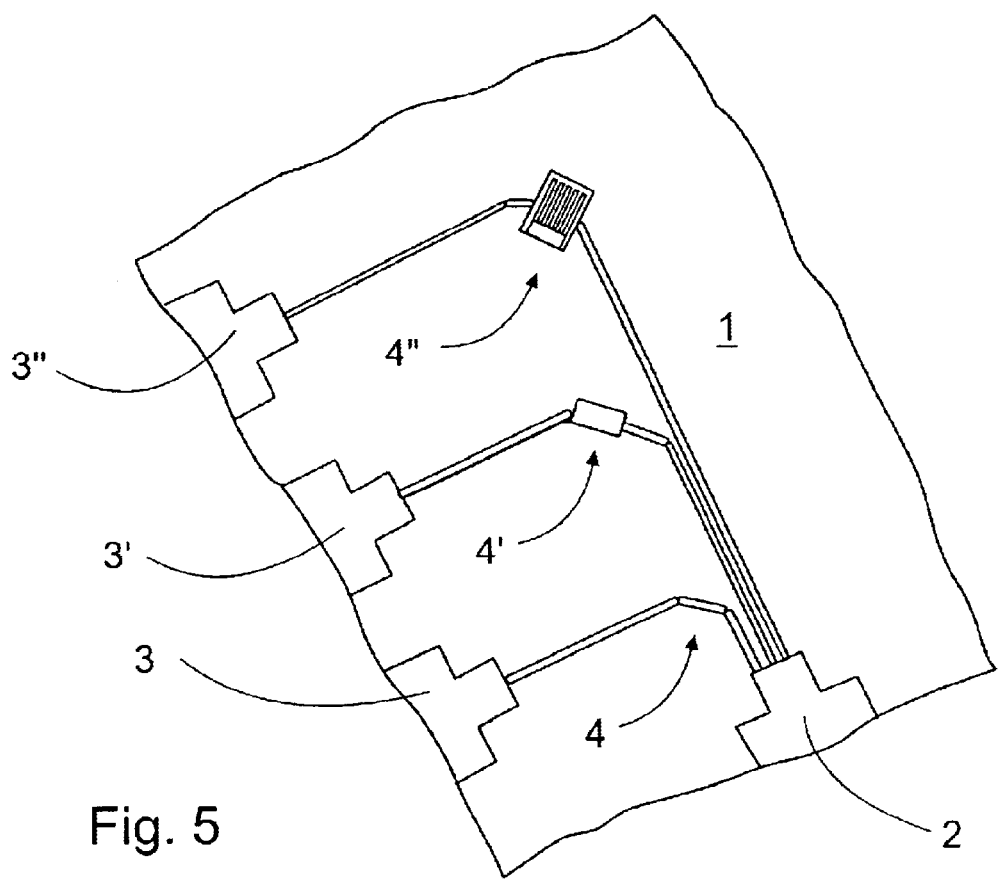
FIG. 5 shows a microcircuit equipped with three sensors.

Usually, the aim is to create a measurement apparatus, by means of which it is possible to measure temperatures over a very wide range. This is preferably achieved by means of a sensor according to FIG. 5, in which there are, for example, two sensors 4', and 4", which function as thermometers based on the known CB tunnelling, and one sensor 4 according to this invention, by means of which the temperature range is extended at least to the room temperature range or even higher. The separate sensors can have a single common electrode 2 and each its own electrode 3, 3', and 3". Naturally, all the sensors can even function in both modes, but it seems to be optimal to fit most of the sensors in a single mode.

Because the aforementioned linear basic formula includes inaccuracy (1–3 K) below 80 K, a more accurate formula may perhaps have to be found for this range, because the small error in the sub area appears to be reproducible.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. A method for measuring temperature T in a wide range using a tunnel junction which includes two metallic conductors and a thin insulator between the conductors, which has a measurable resistance R, characterized in that the resistance R can be measured over the linear section of the voltage-current curve, and the temperature T determined from the formula:

$$\frac{1}{R} = \frac{1}{R_0}\left(1 + \left(\frac{T}{T_0}\right)^2\right),$$

in which $R_0$ is a previously calibrated constant and $T_0$ is a material constant.

2. A method according to claim 1, characterized in that the insulating material is an oxide of one conducting material.

3. A method according to claim 1, characterized in that at least one conductor is fabricated from a material, which belongs to the group aluminium (Al), chromium (Cr), niobium (Nb), copper (Cu).

4. A method according to claim 1, characterized in that the measurement is calibrated by cooling the tunnel junction being measured to a very low temperature, in which case the constant $R_0$ being calibrated is obtained straight from the measured resistance R with a high accuracy.

5. A method according to claim 1, characterized in that the measurement is carried out by using one chain of several tunnel junctions or several such chains connected in parallel.

6. A method according to claim 5, characterized in that the measured resistance R is fit in the range 10 kΩ–1000 kΩ.

7. A method according to claim 5, characterized in that the measurement is carried out using low-frequency alternating current, the amplitude of which is in the range 0.1–10 mV for each of the tunnel junctions in the chain.

* * * * *